United States Patent Office 3,790,663
Patented Feb. 5, 1974

3,790,663
PREPARATION OF DRY ANTISERUM COATED SOLID-PHASE FOR RADIOIMMUNOASSAY OF ANTIGENS
Mary M. Garrison, Silver Spring, and Robert W. Bates, Bethesda, Md., assignors to the United States of America as represented by the Secretary of the Department of Health, Education, and Welfare
No Drawing. Filed July 7, 1970, Ser. No. 52,990
Int. Cl. G01n 31/00, 31/06, 33/16
U.S. Cl. 424—12
10 Claims

ABSTRACT OF THE DISCLOSURE

A dried solid phase for radioimmunoassay of antigens which is stable without refrigeration for extended periods of time, and a method of preparing the solid phase. The solid-phase is prepared by coating an organic polymer with antiserum and then air drying same at about 25° C.

This invention is concerned with solid-phase radioimmunoassay (RIA) of antigens. An improved method of solid phase RIA has been developed which utilizes a solid phase produced by coating an organic polymer with antiserum and then drying the bound antiserum. The bound antiserum is stable to drying and when used for antigen assay the dried antiserum binds antigen after having been stored without refrigeration for several months to nearly the same extent as the undried freshly prepared polymer-antiserum solid phase.

The technique of solid-phase RIA was introduced by Catt and coworkers. This technique involves the bonding of antibodies to a polymeric solid phase. The bonded antiserum will selectively bind antigen for which the antiserum is specific. When radioactively labeled antigen is added to a sample being assayed, such as blood, serum, urine, etc., the labeled and unlabeled antigen compete for binding by the antiserum. The more unlabeled antigen competing for the antiserum binding sites the less labeled antigen will be bound. Thus, by incubating the coated solid-phase with a specimen to which radioactive labeled antigen has been added and then counting the radiation content of the solid-phase the antigen concentration of the specimen can be determined. Catt and coworkers have reported solid-phase RIA techniques wherein the polymer of the solid-phase is in the form of powder (Biochem. J., 100: 31c (1966), plastic tubes (Science, 158: 1570 (1967)) and plastic discs (J. Lab. & Clin. Med., 70: 820 (1967)). However, in none of these techniques is the polymer-antiserum solid-phase dried. It is either used freshly prepared while the antiserum coat is still wet or the coated polymer is stored in a solution of bovine serum albumin at 4° C.

All antiserum is protein and it is, therefore, easily denatured. Accordingly, it would be expected that dehydration of antiserum would produce some denaturation with a resulting loss in antigen binding capacity. Surprisingly, it has been discovered that antiserum bonded to an organic polymer can be dried and stored for extended periods of time at room temperature without appreciable loss of antigen binding capacity. This discovery makes it possible to prepare large quantities of polymer-antiserum solid phase far in advance of the time it is needed for antigen assay and to store and ship the dried solid phase without refrigeration. The bonding of antiserum to an organic polymer is apparently due to adsorption since it obeys Freundlich's Law of Adsorption.

A preferred embodiment of this invention involves bonding the antiserum to the walls of the wells of plastic micro titration trays. For example, polyvinyl chloride plastic trays approximately 8 x 12 cm. and containing 96 wells, each with a capacity of approximately 0.25 ml., are commercially available. A coating of antiserum is bonded to the walls of the wells by filling each well with diluted antiserum and allowing the tray to stand undisturbed for one hour at room temperature. The antiserum solution is then aspirated from the wells, the trays rinsed and allowed to dry at room temperature (approximately 25° C.). The sample containing the antigen being assayed is then placed in the coated wells and incubated thus eliminating the necessity of a separate vessel for carrying out the RIA. The procedure for the assay of antigens is as follows:

PREPARATION OF THE POLYMER-ANTISERUM SOLID PHASE

The wells of a flexible disposable plastic micro titration tray are filled with antiserum diluted 1:1,000 to 1:10,000 with Buffer-C which is prepared as follows:

Buffer-C: Dissolve 8.25 g. of $H_3BO_3$ and 2.70 g. of NaOH in 1 liter of water. Adjust the pH to 8.5 to 9.5 as required. The tray is allowed to stand undisturbed at room temperature (about 25° C.) for one hour. The antiserum solution is then aspirated from the wells and the tray rinsed once by flooding with 0.85% saline followed by a second rinse with 0.85% saline plus 1% bovine serum albumin. The tray may be used immediately, stored overnight in a refrigerator at 4° C. with the wells filled with the second rinse solution or the tray may be dried at room temperature and stored in a desiccator at room temperature for use up to six months later. The temperature at which the tray is dried is critical only to the extent that the temperature must be below that at which the antiserum becomes denatured with a resulting loss in antigen binding capacity. Also, incubation temperatures of about 37° C. are conducive to bacterial growth which may render the trays unusable for antigen assay, particularly if the tray is to be stored for an extended period of time. For extended storage it is important that the antiserum coating be thoroughly dry in order to preserve the antiserum binding capacity and to discourage bacterial growth. Accordingly, it is necessary to store the trays in dry atmosphere such as that produced by a desiccator. It is estimated that this reduces the moisture content of the antiserum coat to less than 10% by weight.

It is well known that most surfaces will adsorb protein. Theoretically, any surface that will adsorb protein and which will not interfere with the RIA can be used as the solid-phase substrate. However, some surfaces, while they will adsorb protein, do not adsorb in sufficient amounts to be satisfactory as the solid-phase substrate for RIA. Typical of this type of material is glass. On the other hand, organic polymers are generally satisfactory as the solid-phase substrate since they adsorb protein in relatively large amounts. Examples of suitable organic polymers are hydrocarbon polymers such as polystyrene, polyethylene, polypropylene, polybutylene, diazotized polystyrene, butyl rubber and other synthetic rubbers. Other suitable organic polymers are polyesters, polyamides, cellulose and cellulose derivatives such as PAB cellulose, acrylates, methacrylates and vinyl polymers such as polyvinyl chloride, polyvinyl fluoride, polyvinylidene. Copolymers such as substituted graft copolymers of polystyrene and polytetrafluoroethylene are also satisfactory. The polymers may be thermoplastic, thermosetting, elastomeric or rigid.

INCUBATION OF ANTIGEN WITH THE POLYMER-ANTISERUM SOLID PHASE

Unknown samples are usually run in replicate at two or more dose levels. Standard curves are established with 8 dose levels (0–40 μu) of added radioactive labeled antigen run in replicate with the unknowns.

Sufficient incubation buffer, Buffer–I, is added to each coated well so that the total volume will be 200 μl. after the standard and unknown sample containing antigens have been added. Buffer–I is prepared as follows:

Buffer–I: Dissolve 8.25 g. of $H_3BO_3$, 2.70 g. NaOH, 3.8 g. disodium EDTA, 1.0 g. sodium azide in 1 liter of water and adjust the pH to 8.5. Subsequently, 6.0 g. of bovine serum albumin (BSA) are added to 100 ml. of the buffer when it is necessary to produce Buffer–I containing 6% BSA. The standard and unknown samples are then added to the wells containing Buffer–I. Radioactively labeled antigen is added last. The trays are then incubated in a refrigerator at 4° C. for 16 hours, care being taken to prevent evaporation during incubation. During incubation the volume of incubate must be maintained and tipping of the tray so that variable coated surface is exposed must be avoided. Inadequate mixing and evaporation can effect the antigen binding and the concentration of the protein in the wells containing the standards must be adjusted with BSA so that the protein concentration of the standards approximate the protein concentration of the unknown samples. The amount of specific antiserum surface area exposed to the incubation mixture is proportional to the surface area of the well of the micro titration tray. Hence it is essential to maintain precise volume control during incubation. The radioactive isotope used as a label is not critical and any convenient isotope label can be used. I–131 and I–125 are routinely used in the assay of protein hormones.

After incubation is complete the liquid in the wells is aspirated and disposed of as radioactive waste. The tray is then rinsed three or more times with tap water and drained. The top of the plate is then dried and the top of the wells sealed with transparent tape which permits numbering of the wells. The numbered wells are then cut from the tray with scissors, placed in counting tubes and the radioactivity counted in an appropriate spectrometer.

DETERMINATION OF ANTIGEN CONCENTRATION

There are a number of ways for determining the antigen concentration of the unknown samples. The simplest is to plot the actual spectrometer count against log-dose on semilog paper and interpolate. Such curves can be normalized by converting the count to Relative Percent Bound (RPB) by dividing the counts in the tubes with added unlabeled antigen ($C_i$) by the count in the tubes having no added antigen ($C_o$) and multiplying the result by 100, thus:

$$RPB = \frac{C_i}{C_o} \times 100$$

The dose-response curve plotted either with counts or RPB v. log-dose are sigmoid in shape. The uptake with labeled antigen alone ($C_o$) should ordinarily be greater than 15% of the added label to avoid extended counting times. The range of sensitivity of the assay depends upon the thickness of the antiserum coat which is determined by the concentration of the coating solution and upon the potency of the antiserum. With lower $C_o$ uptake (more dilute coating solutions) the dosage range is lower and the sensitivity of the assay greater than with more concentrated coating solutions. In the case of insulin assay a dosage range of 1–40 μu/well which equals 5–200 μu/ml. of sample is used. With greater $C_o$ uptake (10–20 times more concentrated coating solutions) the range is raised to 5–200 μu/well.

There must be no added protein such as BSA in the antiserum coating solution. Added protein does not interfere with the assay during incubation and the protein concentrations of the known and unknown samples should be approximately equal. 6% BSA is used to balance the protein concentration of the unknown samples.

The coat of antiserum bonded to the polymer is surprisingly stable to rinsing as is the antigen-antiserum binding produced by incubating the antiserum-polymer solid phase with an antigen containing solution. The nearly irreversible bonding of antiserum to plastic and the nearly irreversible binding of antigen by the bonded antiserum is responsible for the technique's accuracy and reliability.

EXAMPLE I

Insulin assay (1) Lyophilized antibovine insulin serum is dissolved in water to give a concentration of 80 mg./ml. This solution is then diluted with Buffer-C (1:1,000 to 1:10,000). The wells of a polyvinyl chloride plastic flexible disposable micro titration tray are filled with the diluted antiserum and the tray allowed to stand at room temperature for 60 minutes after which the solution is aspirated from the wells. The tray is then rinsed once by flooding with 0.85% saline solution followed by a second rinse with 0.85% saline+1% bovine serum albumin. The tray can be used at once, stored at 4° C. with the second rinse still on it for use the following day, or dried at room temperature and stored in a desiccator at room temperature for subsequent use.

(2) Sufficient Buffer–I.—6% bovine serum albumin is added to each coated well so that the total volume will be 200 μl. after the standard or unknown is added. The standard and unknown samples are then added, one sample per well. Standards are run in replicate at 8 dose levels (0 to 40 μu). 20 μl. of iodine–131 labeled insulin is added last to each well with stirring. The labeled insulin is prepared according to the method of Hunter and Greenwood (Nature, 194; 495 (1962)). It is diluted with Buffer-I to a dilution of 250 μu/ml. (based on starting concentration of insulin) which is 5 μu/20 μl. (about 20,000 c.p.m.). The tray is surrounded with wet toweling to avoid evaporation and placed in a refrigerator at 4° C. for 16 hours. The liquid in the wells is then aspirated and disposed of as radioactive waste. The plate is rinsed 3 times with cool tap water and drained. The top of the tray is dried and the wells sealed with clear plastic tape and numbered. The numbered wells are then cut from the tray with scissors, placed into counting tubes and read in a gamma spectrometer. The insulin concentration of the unknown specimens is determined by the method set forth supra.

The stability of the dried insulin antiserum-polymer solid phase is shown by Table I.

STABILITY OF ANTI-INSULIN SERUM COATED WELLS

Several plastic plates were coated with anti-insulin serum 10 μg./ml. (1:8000 dilution) or 80 μg./ml. (1:1000 dilution) by letting the plates with the wells filled with diluted antiserum stand 1 hour at room temperature. The antiserum was removed and the plates washed with saline and then saline containing 1% bovine serum albumin. The drained plates were allowed to dry at room temperature (2 to 3 hours) and then stored at room temperature in a desiccator containing a desiccant (Drierite).

TABLE I.—RELATIVE PERCENT BOUND (R.P.B.)

| | Time dry | | | | | | |
|---|---|---|---|---|---|---|---|
| | Wet | 2 days | 7 days | 1 month | 2 months | 5½ months | 1 year |
| Percent uptake (100 RPB) | 33 | 36 | 36 | 32 | 31 | 15 | 6 |
| Added insulin μu. (Coat=1:8000): | | | | | | | |
| 0 | 100 | 100 | 100 | 100 | 100 | 100 | 100 |
| 0.6 | 95 | 97 | 96 | 96 | 88 | 88 | 100 |
| 1.25 | 100 | 87 | 95 | 97 | 90 | 88 | 100 |
| 2.5 | 94 | 70 | 84 | 86 | 81 | 68 | 94 |
| 5.0 | 77 | 62 | 69 | 73 | 70 | 61 | 86 |
| 10.0 | 64 | 46 | 52 | 57 | 48 | 54 | 71 |
| 20.0 | 43 | 33 | 31 | 41 | 34 | 42 | 56 |
| 40.0 | 28 | 23 | 18 | 27 | 20 | 26 | 45 |
| Percent uptake (100 R.P.B.) | 51 | 50 | 51 | 52 | 46 | 31 | 12.5 |
| Added insulin μu. (Coat=1:1000): | | | | | | | |
| 0 | 100 | 100 | 100 | 100 | 100 | 100 | 100 |
| 0.6 | 100 | 97 | 97 | 96 | 98 | 99 | 100 |
| 1.25 | 100 | 96 | 96 | 93 | 91 | 93 | 99 |
| 2.5 | 91 | 90 | 90 | 90 | 87 | 87 | 100 |
| 5.0 | 86 | 81 | 81 | 81 | 78 | 75 | 98 |
| 10.0 | 75 | 68 | 64 | 66 | 63 | 58 | 79 |
| 20.0 | 58 | 48 | 45 | 46 | 45 | 42 | 66 |
| 40.0 | 39 | 32 | 27 | 30 | 30 | 26 | 49 |

EXAMPLE II

Thyroid stimulating hormone (TSH) assay

The same procedure outlined in Example I is followed except TSH antiserum is used to coat the walls of the micro titration tray wells and radioactive labeled TSH is added to the standard and unknown samples prior to incubation instead of $I^{131}$ labeled insulin.

EXAMPLE III

Human growth hormone (HGH) assay

The same procedure outlined in Example I is followed except HGH antiserum is used to coat the walls of the micro titration tray wells and radioactive labeled HGH is added to the standard and unknown samples prior to incubation instead of $I^{131}$ labeled insulin.

EXAMPLE IV

Human chorionic gonadotropic hormone (HCG) assay

The same procedure outlined in Example I is followed except HCG antiserum is used to coat the walls of the micro titration tray wells and radioactive labeled HCG is added to the standard and unknown samples prior to incubation instead of $I^{131}$ labeled insulin.

EXAMPLE V

Follicle stimulating hormone (FSH) assay

The same procedure outlined in Example I is followed except FSH antiserum is used to coat the walls of the micro titration tray wells and radioactive labeled FSH is added to the standard and unknown samples prior to incubation instead of $I^{131}$ labeled insulin.

The stability of the dried bound antiserum in Examples II–V is probably similar to that of the insulin antiserum shown in Table I. These results indicate that this technique is applicable to the assay of all antigens.

While the foregoing examples all utilize micro titration trays as the solid phase substrate the invention is not limited to this embodiment since polymeric material in any form or shape such as powder, tubes, flasks, discs, etc. can obviously be used as the solid-phase substrate. If the polymer is in the form of a container such as a tube or flask the antiserum is bonded to the inside of the container and dried. It can then be used to contain the antigen during incubation thus avoiding the necessity of a separate container. On the other hand, if the polymer is not in the form of a container the incubation of the antigen with the antiserum-polymer solid phase must be carried out in a separate vessel. However, regardless of the shape or form of the polymer substrate the dried antiserum-polymer solid phase can be stored in a dry atmosphere at room temperature for extended periods of time without appreciable loss in antiserum binding capacity.

We claim:

1. A method for preparing dry solid-phase for radioimmunoassay of antigens which comprises contacting an organic polymeric substrate capable of adsorbing antiserum with a dilute solution of said antiserum for about 1 hour at about 25° C., removing said antiserum solution from contact with said organic polymeric substrate, washing said organic polymeric substrate to remove all unadsorbed antiserum and air drying the antiserum adsorbed by said organic polymeric substrate at about 25° C.

2. The method of claim 1 wherein said antiserum is selected from the group consisting of antiinsulin, anti-TSH, anti-HGH, anti-HCG and anti-FSH.

3. The method of claim 1 wherein said organic polymeric substrate is in the form of micro titration tray and said antiserum is adsorbed by the walls of the wells of said micro titration tray.

4. The method of claim 3 wherein said micro titration tray is made of polyvinyl chloride.

5. A method for preparing dry solid-phase for radioimmunoassay of antigens which comprises filling the wells of a micro titration tray made of organic polymeric material capable of adsorbing antiserum with dilute antiserum solution buffered at pH 8.5 to 9.5, allowing the wells to stand undisturbed for about 1 hour at about 25° C., removing said antiserum solution from said wells, washing said wells to remove all unadsorbed antiserum, and air drying the antiserum adsorbed by the walls of said wells at about 25° C.

6. The method of claim 5 wherein said antiserum is selected from the group consisting of antiinsulin, anti-TSH, anti-HGH, anti-HCG, and anti-FSH.

7. The method of claim 5 wherein said antiserum is antiinsulin.

8. The method of claim 5 wherein said dilute antiserum solution is made by diluting antiserum 1:1,000 to 1:10,000 with buffer at pH 8.5 to 9.5.

9. The method of claim 5 wherein said micro titration tray is made of polyvinyl chloride.

10. The method of claim 5 wherein said wells are dried until the moisture content of the antiserum adsorbed on the walls of said wells is less than 10% by weight.

(References on following page)

References Cited

UNITED STATES PATENTS

| | | | |
|---|---|---|---|
| 3,415,361 | 12/1968 | Chambliss | 424—12 |
| 3,555,143 | 1/1971 | Axen | 424—12 XR |
| 2,770,572 | 11/1956 | Eldon | 424—11 |
| 3,236,732 | 2/1966 | Arquilla | 424—12 |
| 3,074,853 | 1/1963 | Brewer | 424—12 |

OTHER REFERENCES

Wide, Biochim. Biophys. Acta, vol. 130, 1966, pp. 257–260.

Catt, Science, vol. 158, Dec. 22, 1967, pp. 1570–1572.

Ceska, Acta Indocrinol., vol. 64, May 1970, pp. 111–125.

Oss, J. of The Reticuloendothelial Soc., vol. 3, 1966, pp. 29–40.

ALBERT T. MEYERS, Primary Examiner

A. P. FAGELSON, Assistant Examiner

U.S. Cl. X.R.

424—1, 11, 13, 78